(12) United States Patent
Montena

(10) Patent No.: US 8,337,228 B1
(45) Date of Patent: Dec. 25, 2012

(54) SEALING MEMBER FOR SEALING A CONNECTION BETWEEN A COAXIAL CABLE CONNECTOR AND A PORT

(75) Inventor: Noah Montena, Syracuse, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 0 days.

(21) Appl. No.: 13/156,983

(22) Filed: Jun. 9, 2011

(51) Int. Cl.
*H01R 13/52* (2006.01)

(52) U.S. Cl. ............................ 439/277; 285/80; 277/609

(58) Field of Classification Search .................. 439/277, 439/271, 322, 320, 578, 272, 278, 583; 285/80, 285/57, 133.21, 299, 303, 351; 277/609, 277/630, 637, 616, 624, 626, 644
See application file for complete search history.

(56) References Cited

U.S. PATENT DOCUMENTS

| | | | |
|---|---|---|---|
| 4,299,434 A | 11/1981 | Ishikawa | |
| 5,011,433 A | 4/1991 | Pfeiffer et al. | |
| 5,431,583 A | 7/1995 | Szegda | |
| 6,234,838 B1 | 5/2001 | Wong | |
| 6,899,354 B2 * | 5/2005 | Lanteigne et al. | 285/108 |
| 6,916,203 B2 | 7/2005 | Oyamada et al. | |
| 6,929,265 B2 | 8/2005 | Holland et al. | |
| 6,994,590 B2 | 2/2006 | Nishida | |
| 2005/0148236 A1 | 7/2005 | Montena | |
| 2005/0164553 A1 | 7/2005 | Montena | |
| 2005/0176296 A1 | 8/2005 | Montena | |
| 2006/0105628 A1 | 5/2006 | Montena | |
| 2007/0264887 A1 * | 11/2007 | Petersen et al. | 439/886 |

FOREIGN PATENT DOCUMENTS

JP 2001237023 A 8/2001

* cited by examiner

*Primary Examiner* — Renee Luebke
*Assistant Examiner* — Harshad Patel
(74) *Attorney, Agent, or Firm* — Schmeiser, Olsen & Watts, LLP

(57) ABSTRACT

A female equipment port a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter, wherein the first portion, the second portion, and the transition portion are configured to engage portions of a seal member of a cable connector to form a plurality of environmental seals is provided. Associated methods are also provided.

7 Claims, 9 Drawing Sheets

SEALING MEMBER FOR SEALING A CONNECTION BETWEEN A COAXIAL CABLE CONNECTOR AND A PORT

FIELD OF TECHNOLOGY

The following relates generally to the field of equipment ports for coaxial cable connectors, and more particularly to an equipment port which is sealable from the effects of the environment.

BACKGROUND

In the wireless and 50 ohm industries, very little standardization exists for equipment ports other than the broad adoption of interface contact specifications laid out in MIL-SPEC documents. While adherence to the standard contact dimensions ensures good signal transmission characteristics, the external interface configuration, which affects weatherproofing of connections, is not adequately defined. Many equipment ports are threaded down to their bases; nuts and lockwashers are often threaded onto those threads of the equipment port, as well as having single or double "D" cuts. Ports which follow the general appearance of the port specified by the MIL-SPEC standards for N-female connectors range broadly in the particular dimensions of various surfaces which might be employed for sealing purposes, thus offering only a slight advantage over the fully threaded or D-cut types of ports.

Current N-female equipment ports are not readily sealed, inviting entry of environmental elements. For instance, a typical port meets the MIL-SPEC requirements relating to the inner and outer contacts, but fails to prevent the ingress of environmental elements, such as moisture migration.

Thus, there is a need for an equipment port having a structural configuration that meets the MIL-SPEC standards for interface contact specifications, but also facilitates the formation of one or more environmental seals when a corresponding cable connector is advanced onto the equipment port.

SUMMARY

A first general aspect relates to a seal for an equipment port, the equipment port including a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter, wherein the first portion, the second portion, comprising a first inner sealing surface proximate a first end, the first inner sealing surface configured to sealingly engage the first portion of the port to form a first annular environmental seal; a seal lip proximate a second end, the seal lip having a first surface and a second surface, the first surface configured to sealingly engage the transition portion of the port to form a second annular environmental seal, the second surface configured to sealingly engage the second portion of the port to form a third environmental seal; wherein the seal lip has a ramped surface corresponding to a surface of the transition portion of the port.

A second general aspect relates to a coaxial cable connector comprising: a coupling member, the coupling member including a first end and a second end, an internal threaded portion located on an inner surface configured to threadably engage a threaded portion of a port, and a seal-grasping surface portion; and a sealing member having a first end and a second end, the second end of the sealing member engaged with the seal-grasping surface portion, wherein the sealing member includes a first inner sealing surface proximate the first end, the first inner sealing surface configured to sealingly engage the a first portion of a port to form a first annular environmental seal, a seal lip proximate the second end, the seal lip having a first surface and a second surface, the first surface configured to sealingly engage a transition portion of the port to form a second annular environmental seal, the second surface configured to sealingly engage a second portion of the port to form a third environmental seal, wherein the seal lip has a ramped surface corresponding to a surface of the transition portion of the port.

A third general aspect relates to a sealed connection comprising: an equipment port, the equipment port including a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter; and a seal attached to the equipment port, the seal including a first inner sealing surface proximate a first end, a seal lip proximate a second end, the seal lip having a first surface and a second surface, wherein the seal lip has a ramped surface corresponding to a surface of the transition portion of the port; wherein the first inner sealing surface and the seal lip are configured to engage the portions of the equipment port to form a plurality of environmental seals.

A fourth general aspect relates to a system for sealing a communications connection comprising: an equipment port, the equipment port including a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter; a cable connector configured to mate with the equipment port, the cable connector including a coupling member, the coupling member including a first end and a second end, an internal threaded portion located on an inner surface configured to threadably engage a threaded portion of a port, and a seal-grasping surface portion; a seal attached to the equipment port, the seal including a first inner sealing surface proximate a first end, a seal lip proximate a second end, the seal lip having a first surface and a second surface, wherein the seal lip has a ramped surface corresponding to a surface of the transition portion of the port; wherein the first inner sealing surface and the seal lip are configured to engage the portions of the equipment port to form a plurality of environmental seals.

A fifth general aspect relates to a method of environmentally sealing a connection between a cable connector and a port, the port including a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter, wherein the first portion, the second portion, comprising: providing a sealing member attached to the cable connector, the sealing member including a first inner sealing surface proximate a first end, the first inner sealing surface configured to sealingly engage the first portion of the port to form a first annular environmental seal, a seal lip proximate a second end, the seal lip having a first surface and a second surface, the first surface configured to sealingly engage the transition portion of the port to form a second annular environmental seal, the second surface configured to sealingly engage the second portion of the port to form a third environmental seal, wherein the seal lip has a ramped surface corresponding to a surface of the transition portion of the port; and advancing the cable connector onto the port.

The foregoing and other features of construction and operation will be more readily understood and fully appreciated from the following detailed disclosure, taken in conjunction with accompanying drawings.

BRIEF DESCRIPTION

Some of the embodiments will be described in detail, with reference to the following figures, wherein like designations denote like members, wherein.

Figure 8:
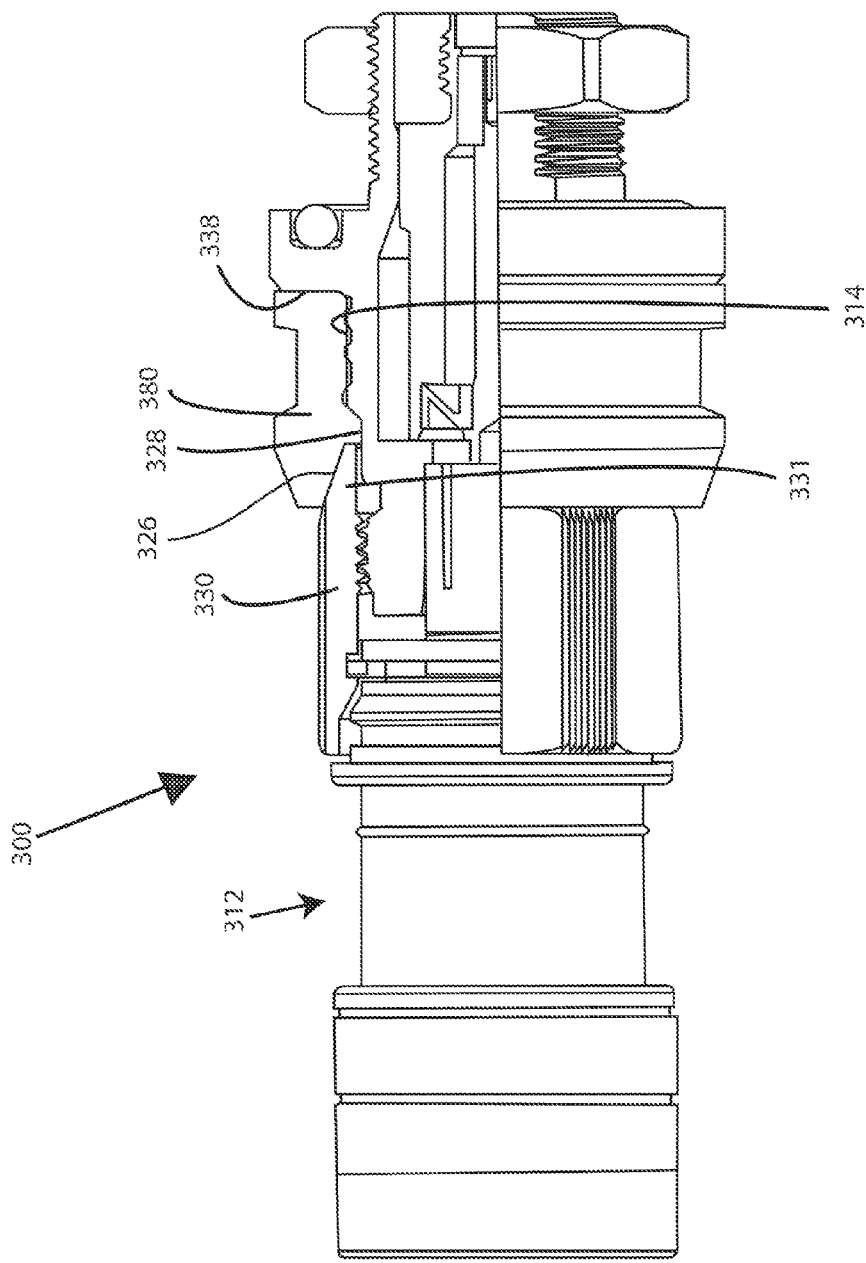
Figure 9:
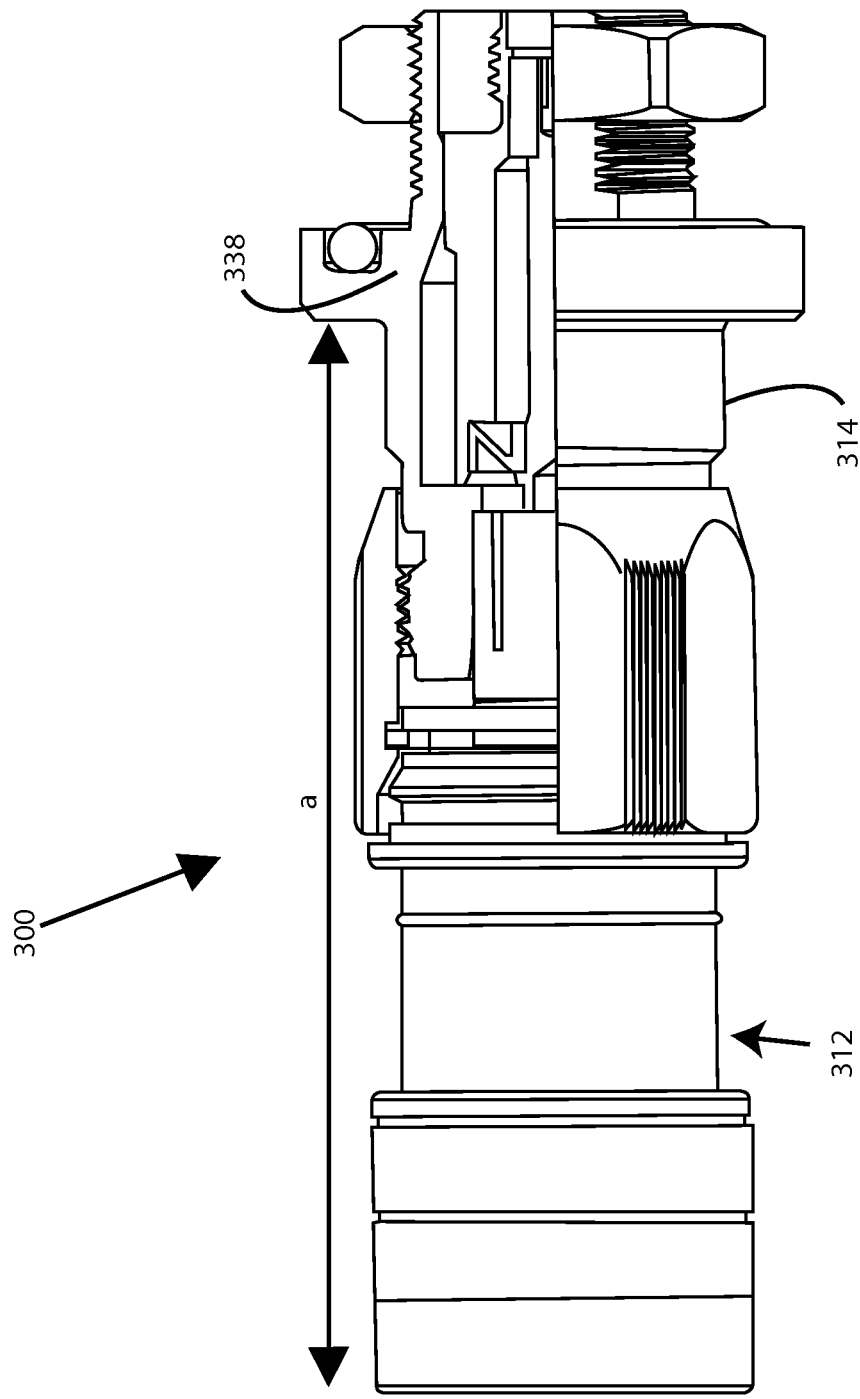

FIG. 8 shows a partial cutaway elevation view of the second embodiment of the N-female equipment port connected to an embodiment of the N-type coaxial cable connector, wherein a custom seal is used to seal the connection; and FIG. 9 shows a partial cutaway elevation view of the second embodiment of the N-female equipment port connected to an embodiment of the N-type coaxial cable connector, wherein sealing tape is used to seal the connection.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms "a", "an" and "the" include plural referents, unless the context clearly dictates otherwise.

Figure 1:
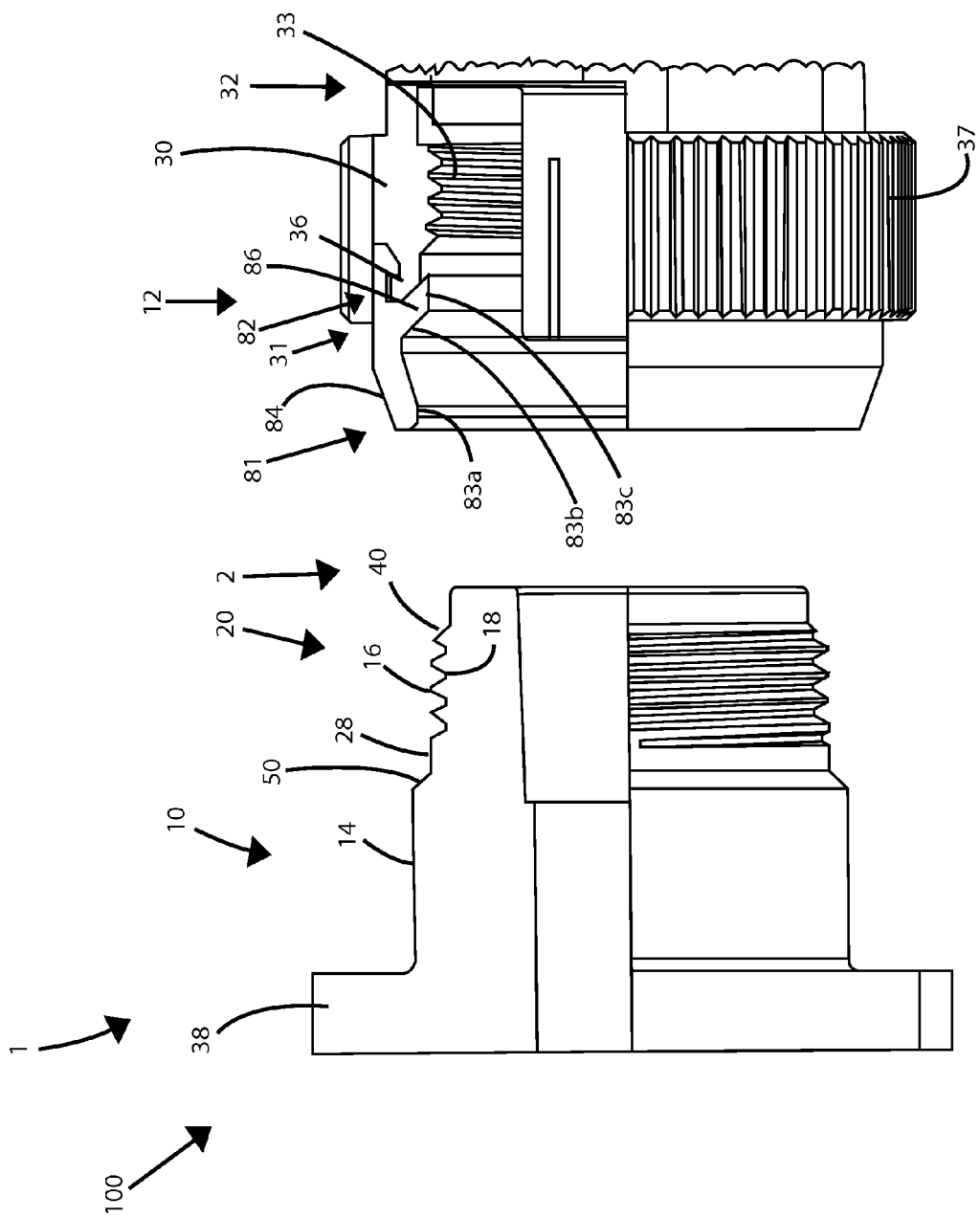
FIG. 1 shows a partial cutaway elevation view of a first embodiment of an N-female equipment port along with an embodiment of an N-type coaxial cable connector.
Figure 2:
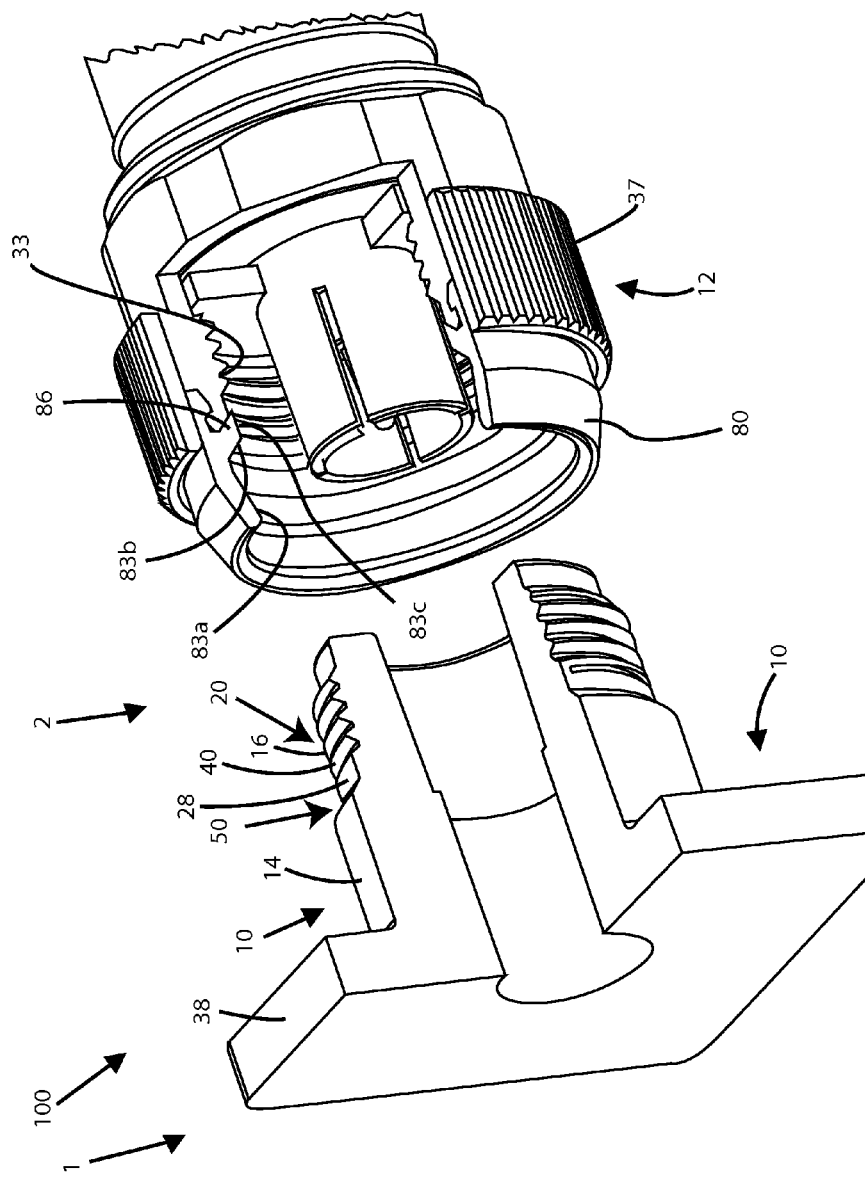
FIG. 2 shows a partial cutaway perspective view of the first embodiment of the N-female equipment port along with an embodiment of the N-type coaxial cable connector.

Referring to FIGS. 1-2, a first embodiment of an equipment port 100 having a first end 1 and an opposing second end 2 is shown. Equipment port 100 may include a first portion 10 proximate or otherwise near the first end 1 having a first diameter and a second portion 20 proximate or otherwise near the second end 2 having a second diameter, wherein the first portion 10 and the second portion 20 are axially separated by a transition portion 50. The transition portion 50 may include a ramped shoulder, an annular tapered surface, annular detent, annular lip, and the like. The first portion 10 may include a smooth cylindrical surface, while the second portion 20 may include both a smooth cylindrical surface and a threaded surface. The transition portion 50 may define a reduction in diameter of the port 100 from the first portion 10 to the second portion 20, configured to engage a seal lip 86 of an elastomeric seal member 80. Moreover, the first diameter of the first portion 10 of the port 100 may be referred to as a major shank 14. The second diameter of the second portion 20 of the port 100 may be referred to as a minor shank 28. The equipment port 10 may further include a base portion 38 proximate, or otherwise defining the first end 1 of the port 100, wherein the base portion 38 is structurally integral with the first portion 10 and the second portion 20 to form a one-piece or structurally integral port 100. The base portion 38 may outwardly extend a radial distance from the first portion 10. Accordingly, the first portion 10 may axially extend from the base portion 38 for cooperative engagement with a connector, such as connector 12.

Furthermore, the minor shank 28 can be integrally connected to major shank 14 via the transition portion 50. For instance, the transition portion 50 may define a difference in diameter of the major shank 14 and a minor shank 28, and may define an axial separation between the major shank 14 and the minor shank 28. Moreover, the second portion 20 of the port 100 may include a threaded portion 40, wherein the threaded portion 40 can be integrally connected to minor shank 28. The threaded portion 40 may be a continuous thread having a pitch and depth that corresponding to an internal threaded portion of connector 12. Embodiments of threaded portion 40 may include a thread major 16 and a thread minor 18, wherein the thread major 16 defines an outermost diameter of the threaded portion 40 and the thread minor 18 defines an innermost diameter of the threaded portion 40 of the second portion 20. Embodiments of the second portion 20 of the port 100 may include a threaded portion 40 having an outermost diameter approximately the same (equivalent, larger, or smaller) than the second diameter of the second portion 20. For instance, the diameter of the minor shank 28 may be the same or substantially the same as thread major 16 to permit a seal member 80, such as a rubber sleeve, to more conveniently pass over the threaded portion 40 of the second portion 20, yet still effectuate a seal against the major shank 14. However, various adjustments and configurations to the size of thread major 16 and the minor shank 28 may be utilized while maintaining the effectiveness of the port 100. However, in most embodiments, the first diameter of the first portion 10 may be greater than the diameter of the threaded portion 40 and/or the second diameter of the second portion 20. For example, a diameter of the major shank 14 can be greater than the diameter of minor shank 28.

Referring again to FIG. 1, an embodiment of a coaxial cable connector 12 may include a coupling element 30, a connector body 245, a compression member 246, and an elastomeric seal 80. Embodiments of a coupling element 30 may include a first end 31, a second end 32, an internal threaded portion 33 located on an inner surface of the connector 12 configured to threadably engage the threaded portion 40 of port 100, a connector-grasping portion, and an outer surface 34, including a seal-grasping surface portion 36. The seal-grasping surface portion 36 may be a flat, smooth surface or a flat, roughened surface suitable to frictionally and/or adhesively engage an interior sealing surface 83 of the sealing member 80. Embodiments of the seal-grasping surface portion 36 may also contain a ridge that together with the seal grasping surface portion 36 forms a groove or shoulder that is suitably sized and shaped to correspondingly engage an internal shoulder of the sealing member 80 adjacent the second interior sealing surface 83b in a locking-type interference fit between the coupling member 30 and the sealing member 80. Moreover, the coupling member 30 may further include a coupling member-turning surface portion 37. The coupling member-turning surface portion 37 may have surface features that facilitate threading onto port 100.

Embodiments of the sealing member 80 may include a first end 81, a second end 82 for ultimate connection to the coupling member 30, a first inner sealing surface 83a, a second inner sealing surface 83b, and an outer surface 84. The sealing member 80 may have a generally tubular body that is elastically deformable by nature of its material characteristics and design. In most embodiments, the seal member 80 is a one-piece element made of a compression molded, elastomer material having suitable chemical resistance and material stability. For example, the sealing member 80 may be made of silicone rubber. Alternatively, the material may be propylene, a typical O-ring material. Other materials known in the art may also be suitable. Furthermore, embodiments of the sealing member 80 may include a first inner sealing surface 83a proximate the first end 81 configured to sealingly engage the surface of the first portion 10 of the port 100 to create/form a first annular environmental seal when the connector 12 is advanced onto port 100. Embodiments of sealing member 80 may further include a seal lip 86 proximate or otherwise near the second end 82 to facilitate a second annular environmental seal around the transition portion 50 of the port 100. The seal lip 86 may extend a radial distance into a generally axial opening of the sealing member 80. The seal lip 86 may have a ramped or tapered surface to cooperate with the ramped or tapered surface of the transition portion 50 of the port 100. The seal lip 86 may include a first surface 83b and a second surface 83c, wherein the first surface 83a is configured to sealingly engage the transition portion 30 to form an annular environmental seal, and the second surface 83c is configured to sealingly engage the second portion 20 of the port 100 to form an annular environmental seal. Therefore, the sealing member 80 may be configured to contact portions of the port 100 to form a plurality of environmental seals.

Figure 3:
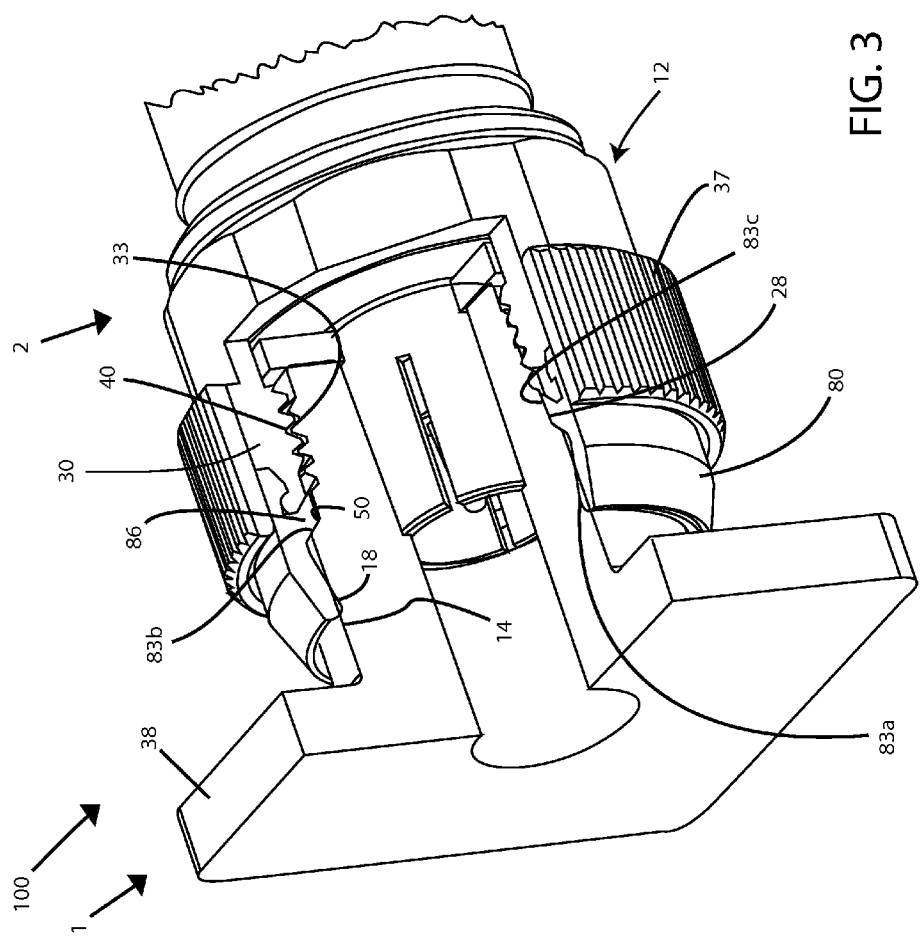
FIG. 3 shows a partial cutaway perspective view of the first embodiment of the N-female equipment port connected to an embodiment of the N-type coaxial cable connector.

With reference to FIG. 3, as cable connector 12 is threadably advanced onto port 100, the internal threaded portion 33 of the coupling member 30 threadably securably engages with the threaded portion 40 of the second portion 20. Additionally, as connector 12 is advanced onto port 100 towards the first end 1 of the port 100, the sealing member 80 is also advanced onto the outer surface of the port 100 towards the first end 1 of the port 100. The seal lip 86 of the sealing member 80 rides up along and makes physical contact with the transition portion 50 (e.g. a ramped shoulder of port 100) to form the second environmental seal. Once the connector 12 is advanced onto port 100, the first inner sealing surface 83a ultimately makes sealing contact around the first portion 10 of the port 100 to form the first environmental seal, and the second surface 83c of the seal lip 86 ultimately makes sealing contact around the second portion 20 of the port 100 form the third environmental seal. For instance, a first environmental seal may be formed by the physical contact between the sealing element 80 (i.e. first inner sealing surface 83a proximate the first end 81) and the major shank 14. A second environmental seal may be formed by the physical contact between the sealing element 80 (i.e. first surface 83b of the seal lip 86) and the transition portion 50. Likewise, a third environmental seal may be formed by the physical contact between the sealing element 80 (i.e. second surface 83c of the seal lip 86) and the minor shank 28 to form the third environmental seal.

Figure 4:
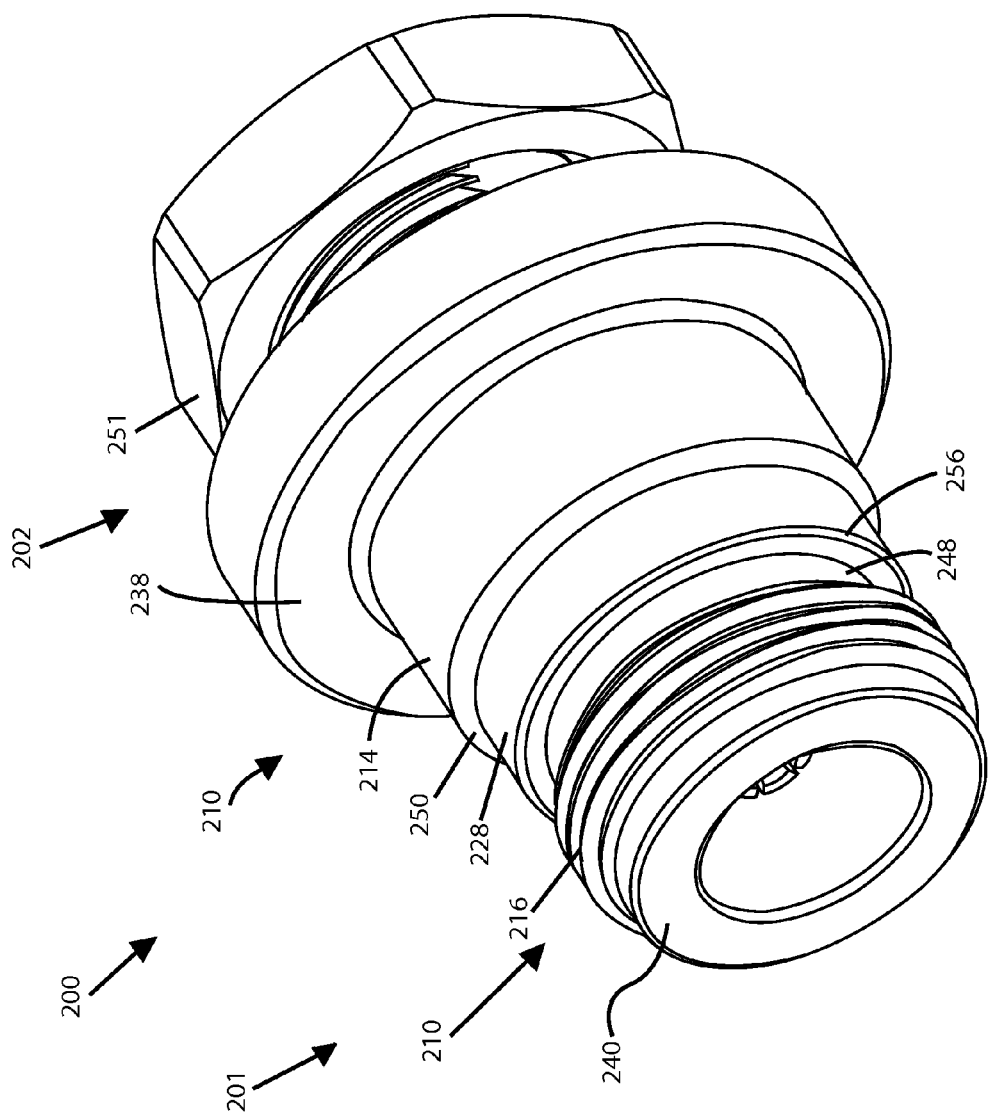
FIG. 4 shows a perspective view of a second embodiment of an N-female equipment port.
Figure 5:
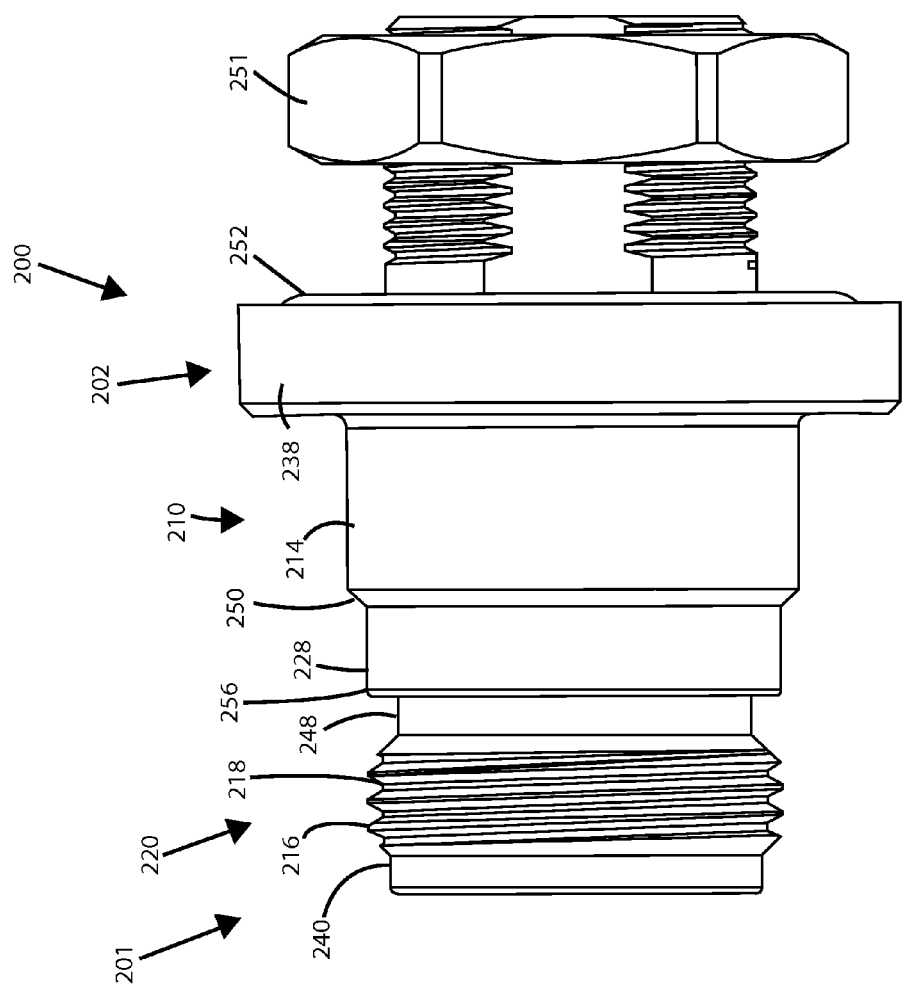
FIG. 5 shows an elevation view of the second embodiment of the N-female equipment port.
Figure 6:
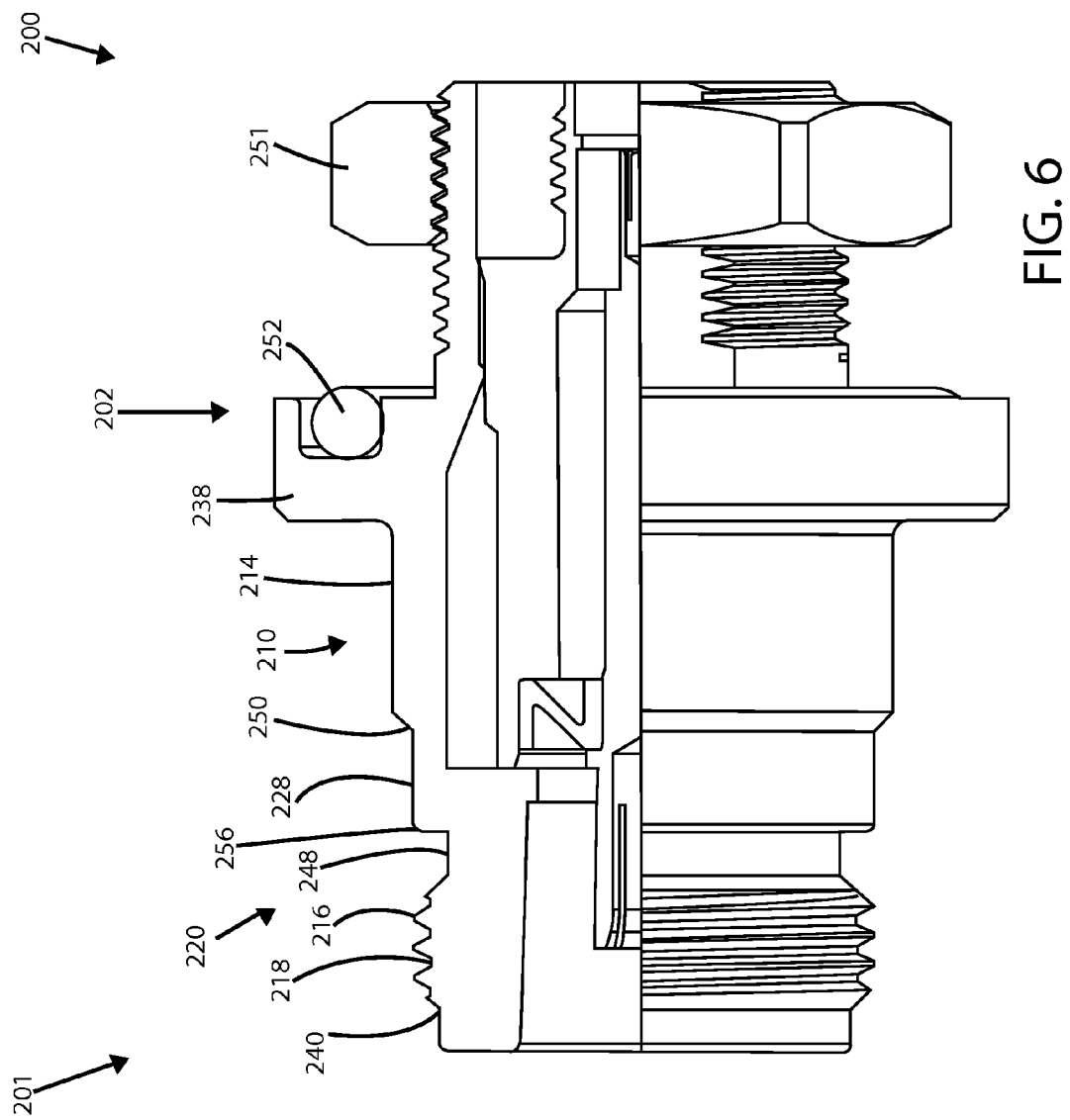
FIG. 6 shows a partial cutaway elevation view of the second embodiment of the N-female equipment port.

With continued reference to the drawings, FIGS. 4-6 depict a second embodiment of an equipment port 200. Embodiments of equipment port 200 may share the same or substantially the same structural and functional aspects as described in association with port 100. For example, equipment port 200 having a first end 201 and an opposing second end 202 may include a first portion 210 proximate or otherwise near the first end 201 having a first diameter and a second portion 220 proximate or otherwise near the second end 202 having a second diameter, wherein the first portion 210 and the second portion 220 are axially separated by a transition portion 250. Further, the equipment port 200 may further include a base portion 238 proximate, or otherwise defining the first end 201 of the port 100, wherein the base portion 238 is structurally integral with the first portion 210 and the second portion 220 to form a one-piece or structurally integral port 200. Embodiments of port 200 (and port 100) may include a major shank 14 having an axial length several times an axial length of the minor shank 28 to provide room for additional various types of sealing component to further effectuate a seal between the cable connector 212 and equipment port 100, 200. However, embodiments of the second portion 220 may include an annular recess 248. In other words, port 200 may include an annular recess 248 between the threaded portion 240 and minor shank 228. A rounded edge 256 preferably separates recess 48 from minor shank 228 to prevent shredding of the sealing member 280 while connecting cable connector 212 to equipment port 200. Moreover, an O-ring 252 may be disposed proximate the base section 238 to seals port 200 to a housing (not shown) when port 200 is fastened to the housing a nut 251. Those skilled in the art should appreciate that embodiments of the O-ring 252 and the nut 251 may also be present with respect to embodiments of port 100.

Figure 7:
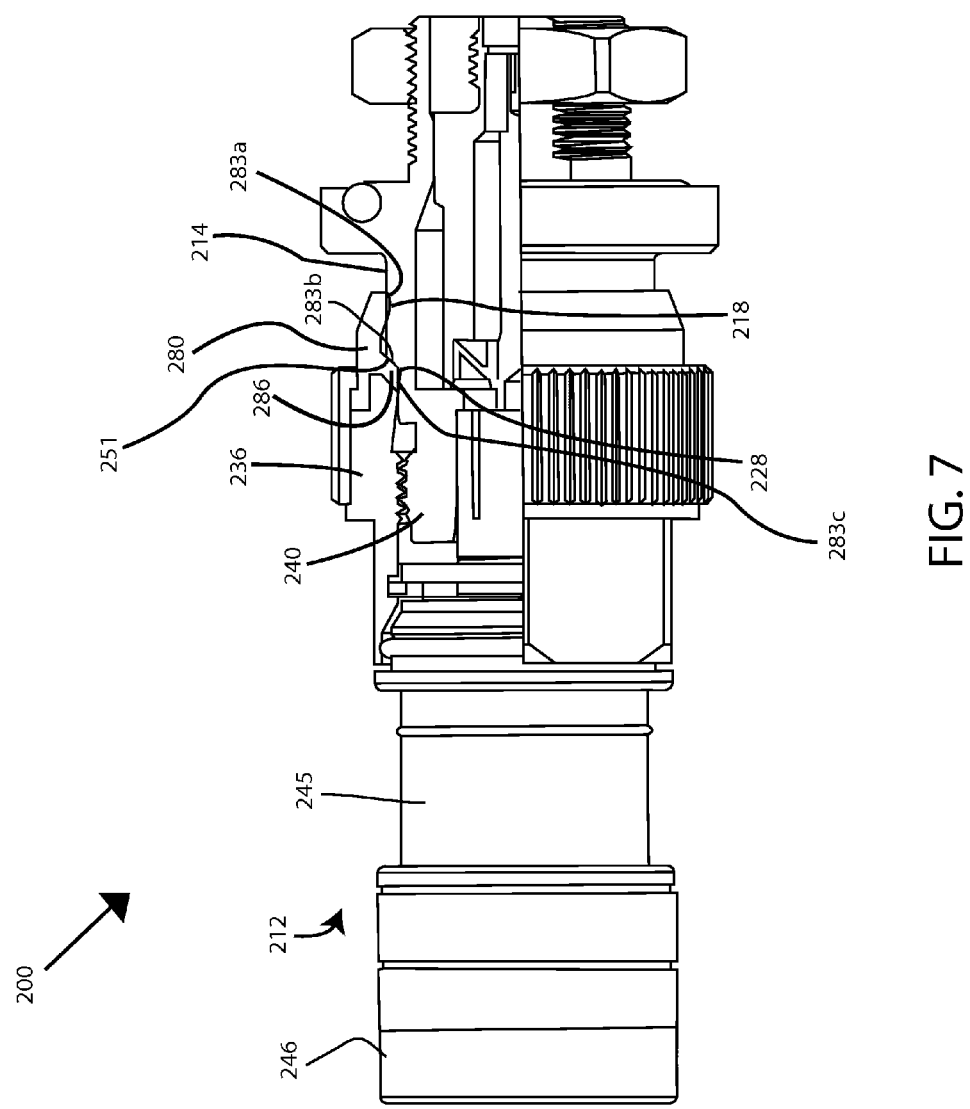
FIG. 7 shows a partial cutaway elevation view of the second embodiment of the N-female equipment port connected to an embodiment of an N-type coaxial cable connector, wherein a seal integral to the cable connector is used to seal the connection.

With reference now to FIG. 7, a connection between cable connector 212 and equipment port 200 is shown. As described supra with respect to the embodiments of port 100, cable connector 212 may include a coupling element 230 and an elastomeric seal member 280. Embodiments of coupling member 230 and sealing member 280 may share the same or substantially the same structural and functional aspects of coupling member 30 and sealing member 80, respectively. As the cable connector 212 is threadably advanced onto port 200, the internal threaded portion 233 of the coupling member 230 threadably securably engages with the threaded portion 240 of the second portion 220. Additionally, as connector 212 is advanced onto port 200 towards the first end 201 of the port 200, the sealing member 280 is also advanced onto the outer surface of the port 200 towards the first end 201 of the port 200. The seal lip 286 of the sealing member 280 rides up along and makes physical contact with the transition portion 250 of port 200 to form the second environmental seal. Once the connector 212 is advanced onto port 200, the first inner sealing surface 283a ultimately makes sealing contact around the first portion 210 of the port 200 to form the first environmental seal, and the second surface 283c of the seal lip 86 ultimately makes sealing contact around the second portion 220 of the port 200 form the third environmental seal. For instance, a first environmental seal may be formed by the physical contact between the sealing element 280 (i.e. first inner sealing surface 283a proximate the first end 281) and the major shank 214. A second environmental seal may be formed by the physical contact between the sealing element 280 (i.e. first surface 283b of the seal lip 286) and the transition portion 250. Likewise, a third environmental seal may be formed by the physical contact between the sealing element 280 (i.e. second surface 283c of seal lip 286) and the minor shank 228 to form the third environmental seal.

Referring to FIG. 8, a connection is shown between an embodiment of cable connector 312 and equipment port 300 in which cable connector 312 includes a coupling member 330 but may not include a sealing member, such as seal member 80, 280. Instead, a customized port seal 380 is used to seal the connection. Embodiments of port seal 380 are shaped so that sealing occurs between port seal 380 and an end 331 of the coupling member 330 of cable connector 312, between port seal 380 and the second portion 320 (e.g. minor shank 328), between port seal 380 and ramped shoulder 326, between port seal 380 and the first portion 310 (e.g. major shank 314), and between port seal 380 and base section 338. The customizable port seal 380 may increase the versatility of an equipment port, such port 300.

Referring to FIG. 9, a connection is shown between cable connector 312 and equipment port 300 in which cable connector 312 includes a coupling member 330 but may not include a seal member 80, 280 or a port seal 380 (as shown in FIG. 9) to seal the connection. Instead, because of the length of the first portion 310 of port 300 (e.g. major shank 314), sealing tape from conventional tape-type sealing kits can be applied over the length of the first portion 310 of the port 300, as shown by double-headed arrow a, to seal the connection from the environment.

Referring now to FIGS. 1-9, a method of environmentally sealing a cable connector 12, 212, 312 connection may comprise: providing an equipment port 100, 200, 300 including a first portion 10, 210, 310 having a first diameter, a second portion 20, 220, 320 having a second diameter and a threaded portion 40, 240, 340, a base section 38, 238, 338 structurally integral with the first portion 10, 210, 310 and the second portion 20, 220, 320, wherein the first portion 10, 210, 310 and the second portion 20, 220, 320 axially extend from the base section 38, 238, 338, enlarging the first diameter of the first portion 10, 210, 310 so that the first diameter is greater than the second diameter, and axially separating the first portion 10, 210, 310 from the second portion 20, 220, 320 with an annular tapered surface 26, 226, 326 to provide a plurality of engagement surfaces. Moreover, a method of manufacturing an N-female equipment port to which a coaxial cable connector makes a connection may comprise the steps of: forming a base 38, 238, 338, forming a major shank 14, 214, 314 one-piece with the base 38, 238, 338 and extending orthogonally to the base 38, 238, 338, forming a minor shank 28, 228, 328 one-piece with the major shank 14, 214, 314 and extending axially from the major shank 14, 214, 314 via a ramped shoulder 26, 226, 326, and forming a threaded portion 40, 240, 340 one-piece with the minor shank 28, 228, 328 and extending axially from the minor shank 28, 228, 328, wherein the threaded portion 40, 240, 340 has a continuous thread having a thread major 16, 216, 316 and a thread minor 18, 218, 318, wherein a diameter of the minor shank 28, 228, 328 is approximately the same as a diameter of the thread major 16, 216, 316, and wherein a diameter of the major shank 14, 214, 314 is greater than the diameter of the minor shank 28, 228, 328.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A coaxial cable connector comprising:
   a coupling member, the coupling member including
      a first end and a second end, an internal threaded portion located on an inner surface configured to threadably engage a threaded portion of a port, and a seal-grasping surface portion; and
   a sealing member having a first end and a second end, the second end of the sealing member engaged with the seal-grasping surface portion, wherein the sealing member includes
      a first inner sealing surface proximate the first end, the first inner sealing surface configured to sealingly engage a first portion of a port to form a first annular environmental seal;
      a seal lip proximate the second end, the seal lip having a first surface and a second surface, the first surface configured to sealingly engage a transition portion of the port to form a second annular environmental seal, the second surface configured to sealingly engage a second portion of the port to form a third environmental seal;
      wherein the seal lip has a ramped surface corresponding to a surface of the transition portion of the port.

2. The coaxial cable connector of claim 1, wherein the coupling member further includes a coupling member-turning surface portion to facilitate threading onto the port.

3. The coaxial cable connector of claim 1, further comprising a connector body and a fastener member.

4. A sealed connection comprising:
   an equipment port, the equipment port including
      a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter; and
   a seal attached to the equipment port, the seal including
      a first inner sealing surface proximate a first end, a seal lip proximate a second end, the seal lip having a first surface and a second surface, wherein the seal lip has a ramped surface corresponding to a surface of the transition portion of the port;
      wherein the first inner sealing surface and the seal lip are configured to engage the portions of the equipment port to form a plurality of environmental seals.

5. A system for sealing a communications connection comprising:
   an equipment port, the equipment port including
      a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter;

a cable connector configured to mate with the equipment port, the cable connector including a coupling member, the coupling member including
    a first end and a second end, an internal threaded portion located on an inner surface configured to threadably engage a threaded portion of a port, and a seal-grasping surface portion; and
a seal attached to the equipment port, the seal including
    a first inner sealing surface proximate a first end, a seal lip proximate a second end, the seal lip having a first surface and a second surface, wherein the seal lip has a ramped surface corresponding to a surface of the transition portion of the port;
    wherein the first inner sealing surface and the seal lip are configured to engage the portions of the equipment port to form a plurality of environmental seals.

6. A method of environmentally sealing a connection between a cable connector and a port, the port including a first portion having a first diameter, a second portion having a second diameter and a threaded portion, a base portion structurally integral with the first portion and the second portion, wherein the first portion axially extends from the base portion, a transition portion axially separating the first portion and the second portion, wherein the first diameter is greater than the second diameter, comprising:
    providing a sealing member attached to the cable connector, the sealing member including a first inner sealing surface proximate a first end, the first inner sealing surface configured to sealingly engage the first portion of the port to form a first annular environmental seal, a seal lip proximate a second end, the seal lip having a first surface and a second surface, the first surface configured to sealingly engage the transition portion of the port to form a second annular environmental seal, the second surface configured to sealingly engage the second portion of the port to form a third environmental seal, wherein the seal lip has a ramped surface corresponding to a surface of the transition portion of the port; and
    advancing the cable connector onto the port.

7. The method of claim 6, further comprising disposing an annular recess between the second portion and a threaded portion of the port.

\* \* \* \* \*